United States Patent
Kostanian

(10) Patent No.: US 6,521,195 B1
(45) Date of Patent: Feb. 18, 2003

(54) MULTI-PHASE EXTRACTION APPARATUS

(75) Inventor: Artak Eranosovich Kostanian, Moskovskaj oblast (RU)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/319,849

(22) PCT Filed: Dec. 12, 1997

(86) PCT No.: PCT/EP97/06994

§ 371 (c)(1),
(2), (4) Date: Jun. 11, 1999

(87) PCT Pub. No.: WO98/26850

PCT Pub. Date: Jun. 25, 1998

(30) Foreign Application Priority Data

Dec. 19, 1996 (RU) .............................. 96123969

(51) Int. Cl.[7] .......................... B01D 1/00; B01D 11/04; B01D 24/00; C02F 1/00
(52) U.S. Cl. ...................... 422/255; 422/254; 422/256; 422/257; 210/DIG. 5; 210/251; 210/283; 210/284; 210/634
(58) Field of Search ................ 422/254, 255, 422/266, 257; 210/DIG. 5, 251, 283, 284, 634

(56) References Cited

U.S. PATENT DOCUMENTS 2,201,549 A * 5/1940 Van Dijck .................... 196/13
5,344,618 A * 9/1994 Saitoh ........................ 422/254
6,129,842 A * 10/2000 Kostanian ................... 422/257

FOREIGN PATENT DOCUMENTS

| FR | 792281 | 12/1935 |
| WO | WO 97/14486 | 4/1997 |
| WO | WO 97/14487 | 4/1997 |
| WO | WO 97/22393 | 6/1997 |

OTHER PUBLICATIONS

Russian Application No. 94–015776/26, dated Apr. 27, 1994.

* cited by examiner

Primary Examiner—Robert J. Warden, Sr.
Assistant Examiner—Imad Soubra
(74) Attorney, Agent, or Firm—Norris McLaughlin & Marcus

(57) ABSTRACT

Multi-phase extraction apparatus comprising two chambers forming a partition stage. Said chambers are connected by connection channels in their upper and lower portions. The upper portion of the first chamber is connected to the lower portion of the second chamber, while the upper portion of the second chamber is connected to the lower portion of the first chamber.

2 Claims, 1 Drawing Sheet

MULTI-PHASE EXTRACTION APPARATUS

The invention starts from a multiphase extraction apparatus having two chambers which are connected in their top and bottom part by connection channels. The chambers are filled with a continuous phase and have separation spaces. They are equipped with dispersion apparatuses and with ports for feeding and removing the feed phase and strip phase.

An apparatus of this type can be used in chemical, hydrometallurgical, microbiological and other industrial branches for separation, extraction, concentration and purification of substances.

Apparatuses for carrying out three-phase liquid extraction processes are known in the form of a two-chamber system, the two chambers being connected together by overflows for the circulation of the continuous phase. The overflows are constructed in the form of tubes which connect together the upper and lower parts of each of the chambers. The chambers are filled with a continuous phase through which two disperse phases, which are not soluble in the continuous phase, are passed in the form of droplets. In this case, substances are transferred from a disperse phase (feed phase) by the continuous phase forming the extraction medium into the other disperse phase (strip phase) (see, for example, Russian Patent Application No. 94-015776/26 of 27.04.94).

These known apparatuses require improvement with respect to their application potential and their performance.

They represent the latest state of the art with respect to design and technical action and are described in more detail below. A conventional multiphase extraction apparatus consists of two chambers filled with a continuous phase. The chambers have apparatuses for dispersing (distributing) the feed phase and strip phase and are connected together by overflows or connection channels for the circulation of the continuous phase. The overflows connect in this case the upper part of the first chamber to the upper part of the second chamber and the lower part of the second chamber to the lower part of the first chamber. The apparatus is equipped with ports for feeding and removing the two disperse phases and has separation spaces which are placed in the area of the inlet orifices of the connection channels (overflows). The phases to be dispersed, feed phase and strip phase, are each divided in the corresponding chamber by an apparatus for dispersion into droplets which then move through the continuous phase as a swarm of droplets. Owing to the difference in density between the dispersion in the first chamber and the dispersion in the second chamber, there is a circulation of the continuous phase through the upper and lower overflows, so that the substance to be separated off is transferred from the feed phase in the one chamber into the strip phase in the other chamber. In this case, the continuous phase in the first chamber serves as extraction medium (and in the second chamber as raffinate phase). A disadvantage of this known multiphase extraction apparatus is that the circulation rate of the continuous phase is only influenced by the density difference between the dispersions in the two chambers; a reduction in this density difference decreases the circulation rate and can lead to a reduced efficacy of the apparatus.

The object underlying the invention is to ensure the efficacy of the multiphase extraction apparatus even in those cases where the density difference between the liquid mixtures in the two chambers is too small to circulate the continuous phase.

This object is achieved according to the invention, starting from the above-described apparatus, by means of the fact that the upper part of the first chamber is connected to the lower part of the second chamber and the upper part of the second chamber is connected to the lower part of the first chamber.

A further development of the invention is characterized in that the two chambers form a separation stage and a number of such separation stages is series connected.

The connection of the upper part of the first chamber to the lower part of the second chamber and of the upper part of the second chamber to the lower part of the first chamber ensures the circulation of the continuous phase even if there is no density difference (based on the mean density of the dispersion in each chamber) between the two-phase liquid mixtures in the one chamber and the other. The circulation arises solely due to density gradients within the individual chambers and by impulse transfer from the droplet swarms, which are produced in the dispersion apparatuses, to the molecules of the continuous phase.

A further advantage is that the two chambers can be operated in cocurrent flow (same direction of motion of continuous phase and disperse phase). The utilization of the two chambers as a separation stage and the series-connection of a number of such stages permits various multistage mass separation processes to be carried out optimally.

FIGS. 1–3 show diagrammatically three possible embodiments of the multiphase extraction apparatus according to the invention.

Figure 1:
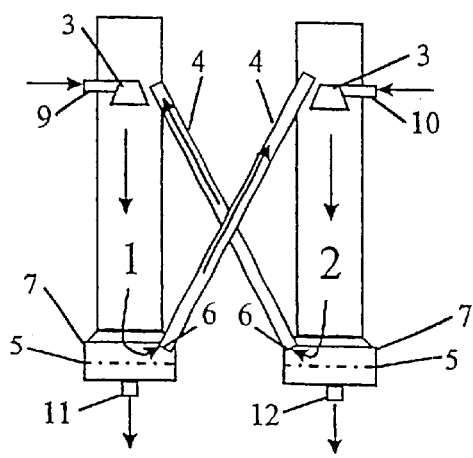
FIG. 1 shows a single-stage apparatus with cocurrent flow of the phases through the two chambers
Figure 2:
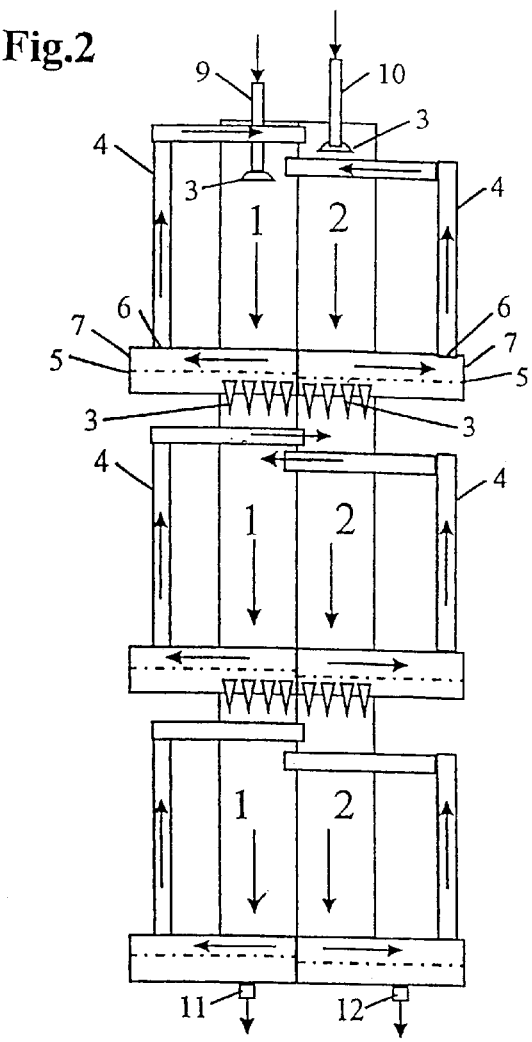
FIG. 2 shows a multistage apparatus in which a plurality of two-chamber separation stages are accommodated in one housing and the feed phase and strip phase are conducted in cocurrent flow based on the overall connection of the separation stages.
Figure 3:
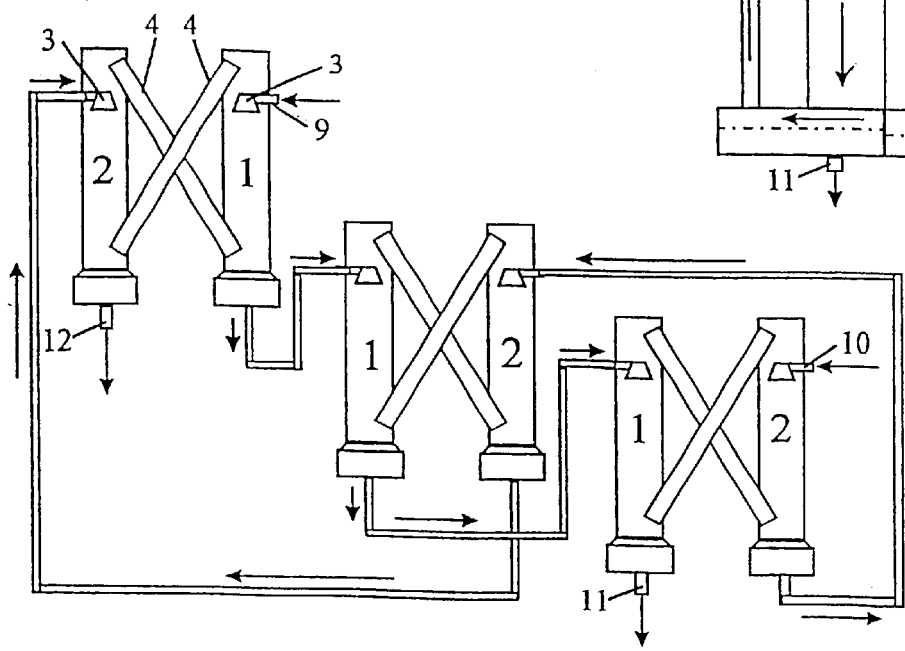
FIG. 3 shows a multistage apparatus which consists of a plurality of two-chamber separation stages and in which the feed phase and strip phase are conducted in countercurrent flow based on the overall connection of the separation stages.

A separation stage of the multiphase extraction apparatus fundamentally consists, in all embodiments, of the first chamber 1 and the second chamber 2 which are both equipped with a dispersion apparatus 3. The chambers 1 and 2 are connected in their upper and lower parts by connection channels or overflows 4. In this case the overflows 4 connect the upper part of chamber 1 to the lower part of chamber 2 and the upper part of chamber 2 to the lower part of chamber 1. As shown in FIGS. 1–3, the phase boundary 5 of the contacting phases (disperse phase and continuous phase) is beneath the inlet orifices 6 of the connection channels 4. The chambers 1 and 2 of the multiphase extraction apparatus have separation spaces 7 in which the phase boundary 5 is situated. The apparatus is equipped with ports 9 and 10 for feeding the feed phase and strip phase and with ports 11 and 12 for removing the feed phase and strip phase.

The multiphase extraction apparatus operates according to the following principle:

The first chamber 1 and second chamber 2 are filled with the continuous phase as extraction medium. The feed and strip phases are fed into the chambers via the ports 9 and 10 and the distribution apparatuses 3. The distribution apparatuses 3 distribute the phases in the form of droplets into the continuous phase. A homogeneous dispersion of the disperse phases in the two chambers is not absolutely necessary to carry out mass separation processes. The disperse phase can also be introduced into one of the two chambers in the form of strands or films. On account of their higher density in comparison with the continuous phase, the droplets of the disperse phases move downwards in the chambers 1 and 2 and coalesce at the interface 5 in the separation spaces 7. The droplet swarms in the chambers 1 and 2 move here cocurrently with the continuous phase. The continuous phase circulates not only due to the density difference between the dispersions within the chambers but also due to the impulse transfer from the disperse phase to the continuous phase and from flow forces between the disperse phase and continuous phase.

The connection according to the invention of the chambers 1 and 2 by the overflows 4 permits the exploitation of these effects to accelerate (drive) the continuous phase, which causes the continuous phase to circulate between the chambers 1 and 2 via the overflows 4 through the inlet orifices 6, the inlet orifices being arranged above the phase boundary 5 in the separation spaces 7. The component to be separated off is transferred in this manner from the feed phase via the continuous phase to the strip phase. The feed phase and strip phase are removed from the multiphase extraction apparatus by the ports 11 and 12.

The multiphase extraction apparatus according to FIG. 1 can also readily be used for separation processes in which the disperse phases have a lower density than the continuous phase. For this purpose, the apparatus is turned by 180 degrees, so that the filling ports (9, 10) and the dispersion apparatuses (3) are at the bottom and the ports (11, 12) for removing the feed phase and strip phase are at the top. In this case, the phase boundary 5 is in the separation spaces 7 above the orifices for the overflows 4

In the multistage apparatus according to FIGS. 2 and 3, the processes of extraction and re-extraction are repeated in each separation stage. Depending on how the separation stages are connected in series, various variants of the mass separation process can be implemented with respect to the flow direction (cocurrent flow or countercurrent flow). It must be noted here that within each two-chamber separation stage the separation process always proceeds in cocurrent flow of the disperse and continuous phases.

Based on the overall connection of the separation stages, however, optionally, cocurrent flow (FIG. 2) or countercurrent flow (FIG. 3) of the disperse and continuous phases can be implemented.

I claim:

1. Multiphase extraction apparatus having at least two chambers (1, 2) forming a separation stage, which chambers are connected in their upper and lower parts by connection channels (4), are equipped with dispersion apparatuses (3), have separation zones (7) which are placed in the region of the inlet orifices (6) of the connection channels (4), and have ports (9, 10, 11, 12) for feeding and removing a feed phase and a strip phase, characterized in that the upper part of the first chamber is connected to the lower part of the second chamber and the upper part of the second chamber is connected to the lower part of the first chamber.

2. Extraction apparatus according to claim 1, characterized in that a plurality of separation stages are connected in series.

* * * * *